Patented Aug. 14, 1923.

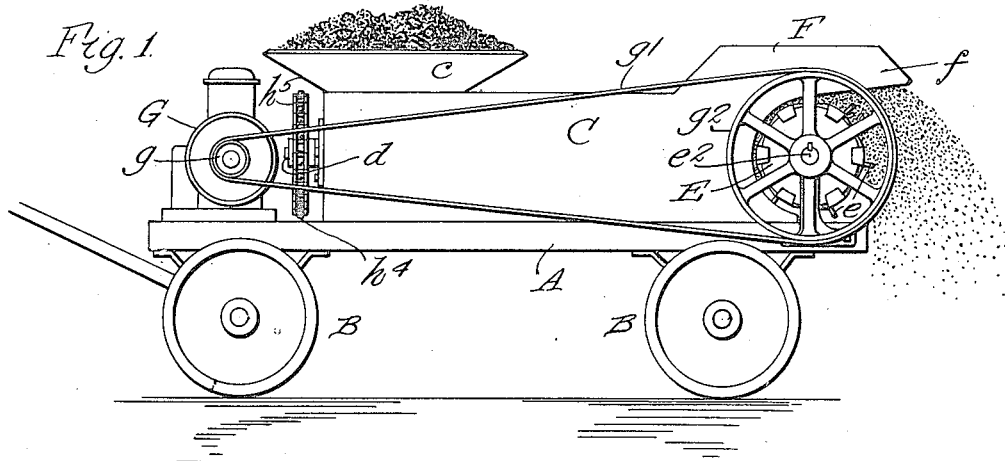
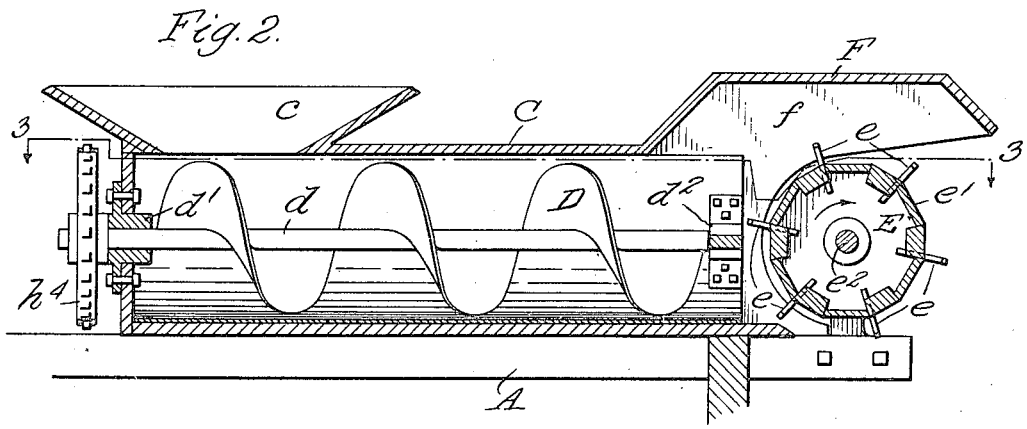
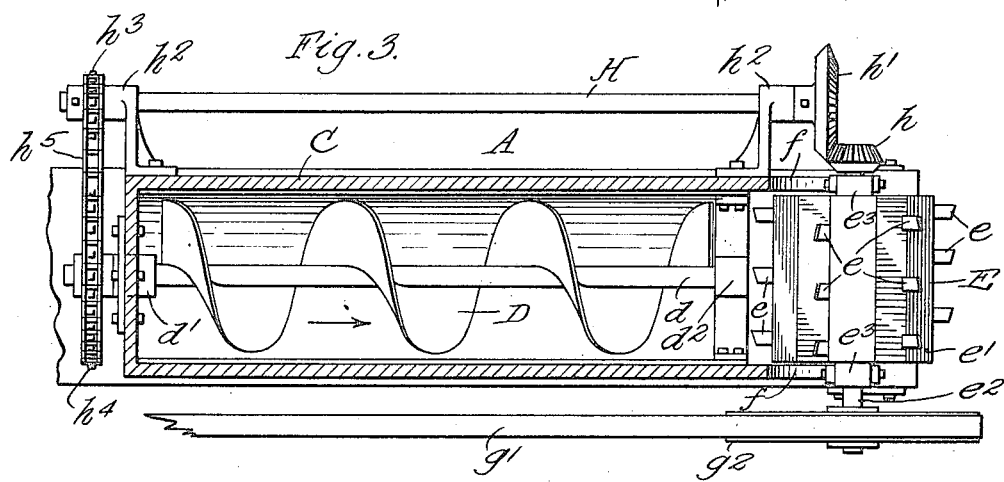

1,464,621

UNITED STATES PATENT OFFICE.

NELSON J. KEMP, OF BATAVIA, NEW YORK.

APPARATUS FOR MIXING AND BREAKING UP EARTH AND FERTILIZER.

Application filed November 22, 1920. Serial No. 425,607.

*To all whom it may concern:*

Be it known that I, NELSON J. KEMP, a citizen of the United States, residing at Batavia, in the county of Genesee and State of New York, have invented a new and useful Improvement in Apparatus for Mixing and Breaking up Earth and Fertilizer, of which the following is a specification.

This invention relates to apparatus for mixing soil and fertilizer for use in connection with greenhouses or hothouses, or for other purposes.

In greenhouses it is generally customary after each crop to replace the soil by fresh, outdoor soil mixed with fertilizer, and the soil and fertilizer must be thoroughly mixed and reduced to a finely divided state to produce the best results. This mixing and breaking up of the soil and fertilizer was heretofore generally done manually and consequently required much time and labor, especially in large greenhouses, in which large quantities of soil and fertilizer had to be mixed and broken up.

The objects of this invention are to provide a machine for mixing and pulverizing soil and fertilizer, which is so constructed as to eliminate a large amount of labor now necessary and which delivers a mixture of soil and fertilizer which is ready for use; also to improve the construction of machines of this kind in other respects hereinafter specified.

In the accompanying drawings:

Fig. 1 is a side elevation of an apparatus embodying the invention, for mixing and breaking up soil and fertilizer.

Fig. 2 is a fragmentary longitudinal central sectional elevation thereof.

Fig. 3 is a fragmentary longitudinal sectional plan view thereof on line 3—3, Fig. 2.

A represents the frame or base of the machine, which may be of any usual or suitable construction and upon which the parts of the machine are mounted. The base in the construction shown is supported upon wheels B so that the machine can readily be moved from place to place, but these wheels may be omitted in case it is not necessary to have a portable machine.

The machine shown in the drawings consists of a trough or conveyor housing C having a hopper or other opening $c$ at one end thereof. Within the trough C is arranged a spiral conveyor or feed screw D which extends substantially throughout the length of the trough C. The trough and conveyor are of sufficient length so that a considerable mixing of the soil and fertilizer takes place within the trough, due to the action of the spiral conveyor in feeding the soil and fertilizer from one end of the trough to the other. The screw conveyor D is mounted on a shaft $d$ which is journalled in bearings $d'$ and $d^2$ arranged at the front and rear end portions of the trough respectively. The front end of the conveyor extends under the hopper $c$ so that any material passing from the hopper into the trough C will be fed toward the rear or discharge end of the machine by the conveyor. The conveyor trough is preferably closed except at the hopper, so that material can only be supplied to the conveyor at the front end thereof.

At the rear end of the machine is arranged a rotary beater drum E having its shaft extending transversely of the machine. This drum is provided with projections or beater teeth $e$ and is adapted to rotate in the direction of the arrow in Fig. 2. These beater teeth preferably consist of substantially flat strips of metal secured on the drum and projecting outwardly therefrom, the teeth being so arranged that the flat faces thereof face the direction of movement of the teeth when the drum is rotating. The beater drum is arranged at the discharge end of the conveyor D and the teeth of the drum are adapted to engage the mass of soil and fertilizer fed toward the rear of the machine, and each tooth carries a small portion of the soil and fertilizer from the discharge end of the conveyor rearwardly and upwardly and discharges the mixture at the rear of the machine. The beater drum E preferably revolves at a compartively high rate of speed and each tooth in passing the material fed by the conveyor carries only a small portion of material at one time. Consequently, no large lumps of material are carried by the beater teeth, which break off parts of the lump and carry the parts upwardly from the material fed by the conveyor, and in passing through the mass of material fed by the conveyor the teeth produce a plowing or mixing and breaking-up action in the mass of material, which ensures a very thorough mixing and breaking up of the soil and fertilizer.

A shield or covering portion F is preferably arranged over the beater drum in such a manner that the particles of fertilizer and soil are hurled by the beater teeth against the shield, thus causing a further breaking up and mixing of the soil and fertilizer and preventing the hurling of stones or particles of material, which might injure the workmen, and causing the mixture to be deposited in a pile at the discharge end of the machine. The covering portion F is preferably so formed as to deflect any material striking the same toward the rear or discharge end of the machine, at which end the finely divided and thoroughly mixed soil and fertilizer is discharged. The shield or covering portion F may be secured on the frame of the vehicle in any desired manner that shown forming substantially a continuation of the top of the conveyor trough and being supported from the frame of the machine by means of side walls $f$, which also help to prevent material from being thrown sidewise out of the machine. The beater drum in the construction shown has an entirely closed periphery $e'$ which prevents any of the material from entering into the interior of the drum and thus being discharged from the machine without being broken up. The beater drum is preferably mounted on a shaft $e^2$, which in the construction shown is journalled in suitable bearings $e^3$.

The parts of the machine may be driven by any suitable means. In the construction shown, a motor G is employed, which is mounted on the frame A, preferably at the front end of the machine. This motor may be of any suitable or desired kind, an electric motor or an internal combustion engine being preferably used. The motor in the construction shown is provided with a pulley $g$ which cooperates with a belt $g'$ to drive a pulley $g^2$ secured on one end of the beater drum shaft $e^2$.

The spiral conveyor D may be driven in any desired manner, for example, this conveyor may be driven from the beater drum shaft. In the construction shown for this purpose, one end of the beater drum shaft is provided with a bevelled pinion $h$, meshing with a bevelled gear $h'$ secured on a shaft H arranged at one side of the machine. In the construction shown this shaft is journalled in bearings $h^2$ secured on the machine. The front end of the shaft H is provided with a sprocket wheel $h^3$ which drives a larger sprocket wheel $h^4$ through the medium of a chain $h^5$. The sprocket wheel $h^4$ is mounted on the front end of the conveyor shaft $d$. By means of this arrangement the beater drum is driven at a considerably higher rate of speed than the spiral conveyor so that the beater teeth cut or break up the soil and fertilizer and enable the machine to discharge a mixture of fertilizer and soil which is ready for use in a greenhouse or hothouse.

In the operation of the machine, the soil and fertilizer are supplied in the desired proportions to the hopper C, this being preferably done by shoveling or otherwise supplying the fertilizer and soil to the hopper in the approximate proportions desired. The soil and fertilizer are then moved toward the rear of the machine by means of the spiral conveyor D, which to a certain extent mixes the soil and fertilizer and feeds the partly mixed materials to the beater drum. The beater drum then engages the material, the teeth of the drum having a tearing or disintegrating action on the larger particles or lumps and hurling some of the material toward the cover or shield F. The material from the beater drum teeth and shield F is then dropped from the discharge end of the machine and is ready for use.

I claim my invention:

1. In a machine for mixing and disintegrating fertilizer and soil, the combination of a conveyor trough to which the soil and fertilizer are fed, a spiral conveyor in said trough for mixing the materials in said trough and for feeding the material to one end of said trough, a revolving drum arranged at said end of said conveyor with its axis extending transversely of the axis of said conveyor and substantially in the same plane therewith, and beater teeth which extend outwardly from said drum and which are adapted to pass through the material at the end of said conveyor for mixing and breaking up said material.

2. In a machine for mixing and disintegrating fertilizer and soil, the combination of a conveyor trough to which the soil and fertilizer are fed, a spiral conveyor in said trough for mixing the material in said trough and for feeding the material to one end of said trough, a revolving drum arranged at said end of said conveyor with its axis extending transversely of the axis of said conveyor and substantially in the same plane therewith, beater teeth which extend outwardly from said drum and which are adapted to pass through the material at the end of said conveyor for mixing and breaking up said material, and a shield arranged in operative relation to said drum and against which the material is hurled by said teeth for further mixing and disintegrating the material.

3. In a machine for mixing and disintegrating fertilizer and soil, the combination of a conveyor trough to one end of which soil and fertilizer may be fed, means in said trough for feeding said material lengthwise of said trough to the other end thereof, a plurality of beater teeth arranged adjacent to the discharge end of said trough and adapted to pass through the material at the discharge end of said trough in a direction substantially at right angles to the direction of movement of said material and to remove all of the material from said trough, and a shield arranged above said teeth against which the material is hurled by said teeth to further disintegrate the same, said shield forming a discharge passage through which the disintegrated material may be dropped in a heap at the end of the machine.

Witness my hand this 19th day of November, 1920.

NELSON J. KEMP.